US008800725B2

(12) United States Patent
Alois

(10) Patent No.: US 8,800,725 B2
(45) Date of Patent: Aug. 12, 2014

(54) ELEVATOR LINER APPARATUS AND UTILIZATION METHOD THEREOF

(76) Inventor: Dominick J. Alois, Franklin Square, NY (US)

( * ) Notice: Subject to any disclaimer, the term of this patent is extended or adjusted under 35 U.S.C. 154(b) by 75 days.

(21) Appl. No.: 13/338,931

(22) Filed: Dec. 28, 2011

(65) Prior Publication Data

US 2012/0168263 A1 Jul. 5, 2012

Related U.S. Application Data

(60) Provisional application No. 61/430,051, filed on Jan. 5, 2011.

(51) Int. Cl.

| | |
|---|---|
| ***B66B 7/00*** | (2006.01) |
| ***B66B 7/02*** | (2006.01) |
| ***B66B 9/00*** | (2006.01) |
| ***E04G 21/14*** | (2006.01) |
| ***E04B 1/34*** | (2006.01) |
| ***B23P 11/00*** | (2006.01) |

(52) U.S. Cl.

USPC ................. 187/414; 187/408; 52/30; 52/632; 52/742.15; 52/745.03; 52/745.2; 29/429; 29/469; 29/525.01

(58) Field of Classification Search

USPC .............. 29/428, 430, 464, 467, 469, 525.01; 52/30, 632, 745.02, 745.03, 745.18, 52/745.21; 187/414, 900, 408

IPC ....... B66B 7/00,7/02, 9/00, 11/00; E04G 21/14; E04B 1/34; B23P 11/00

See application file for complete search history.

(56) References Cited

U.S. PATENT DOCUMENTS

| | | | | | |
|---|---|---|---|---|---|
| RE28,367 | E | * | 3/1975 | Rich, Jr. et al. | 52/79.11 |
| 3,984,952 | A | * | 10/1976 | Loomis | 52/127.1 |

(Continued)

FOREIGN PATENT DOCUMENTS

| | | | | | |
|---|---|---|---|---|---|
| EP | 0 234 324 | A2 | | 1/1987 | |
| EP | 234324 | A | * | 9/1987 | B66B 13/12 |

(Continued)

OTHER PUBLICATIONS

Shipping Container Architecture, Wikipedia (http:/en.wikipedia.org/wiki/Shipping_container_architecture), pp. 1-7.

(Continued)

*Primary Examiner* — William A Rivera
*Assistant Examiner* — Stefan Kruer
(74) *Attorney, Agent, or Firm* — F. Chau & Associates, LLC

(57) ABSTRACT

Elevator liner apparatuses are pre-fabricated corresponding to an amount of multiple floors of a building being constructed. Each elevator liner apparatus includes a liner frame sized to accommodate an elevator cab and elevator rails within the liner frame. Rail mounting brackets are mounted to interior walls of the liner frame. The rail mounting brackets have elevator rail sections affixed thereto and have mounting bracket studs mounting the rail mounting brackets to the liner frame and extending beyond exterior walls of the liner frame. Anchor spikes are mounted to the liner frame and extend beyond the exterior of the liner frame such that plywood forms configured to form concrete elevator shaft walls are coupleable to the anchor spikes. Concrete is pourable between the plywood forms and the exterior of the liner frame. The concrete when dried affixes the mounting bracket studs and the anchor spikes in the dried concrete.

18 Claims, 11 Drawing Sheets

(56) References Cited

U.S. PATENT DOCUMENTS

| | | | | |
|---|---|---|---|---|
| 4,231,148 | A * | 11/1980 | Harding | 29/469 |
| 4,986,040 | A * | 1/1991 | Prewer et al. | 52/79.1 |
| 6,196,356 | B1 * | 3/2001 | Sneed | 187/408 |
| 6,516,570 | B2 * | 2/2003 | Liebetrau et al. | 52/30 |
| 6,540,048 | B1 * | 4/2003 | Muller | 187/325 |
| 6,830,133 | B2 * | 12/2004 | Sneed | 187/408 |
| 6,991,070 | B1 * | 1/2006 | Sanz Gamboa | 187/408 |
| 7,226,033 | B2 * | 6/2007 | Foucher et al. | 249/44 |
| 2005/0204687 | A1 * | 9/2005 | Raftery et al. | 52/741.1 |
| 2007/0084135 | A1 | 4/2007 | Ritter et al. | |
| 2007/0131840 | A1 * | 6/2007 | Jones et al. | 249/34 |
| 2008/0134589 | A1 * | 6/2008 | Abrams et al. | 52/79.1 |
| 2010/0287876 | A1 * | 11/2010 | Van Der Meijden et al. | 52/741.1 |

FOREIGN PATENT DOCUMENTS

| | | | | | |
|---|---|---|---|---|---|
| EP | 1 321 417 | A1 | | 7/2002 | |
| EP | 1321417 | A1 | * | 6/2003 | B66B 11/00 |
| FR | 2816301 | A1 | * | 5/2002 | B66B 7/02 |
| JP | 04345483 | A | * | 12/1992 | B66B 7/00 |
| JP | 08026622 | A | * | 1/1996 | B66B 7/02 |
| JP | 10139304 | A | * | 5/1998 | B66B 7/00 |
| JP | 2003261272 | A | * | 9/2003 | B66B 7/00 |

OTHER PUBLICATIONS

International Search Report Dated Dec. 11, 2013.

* cited by examiner

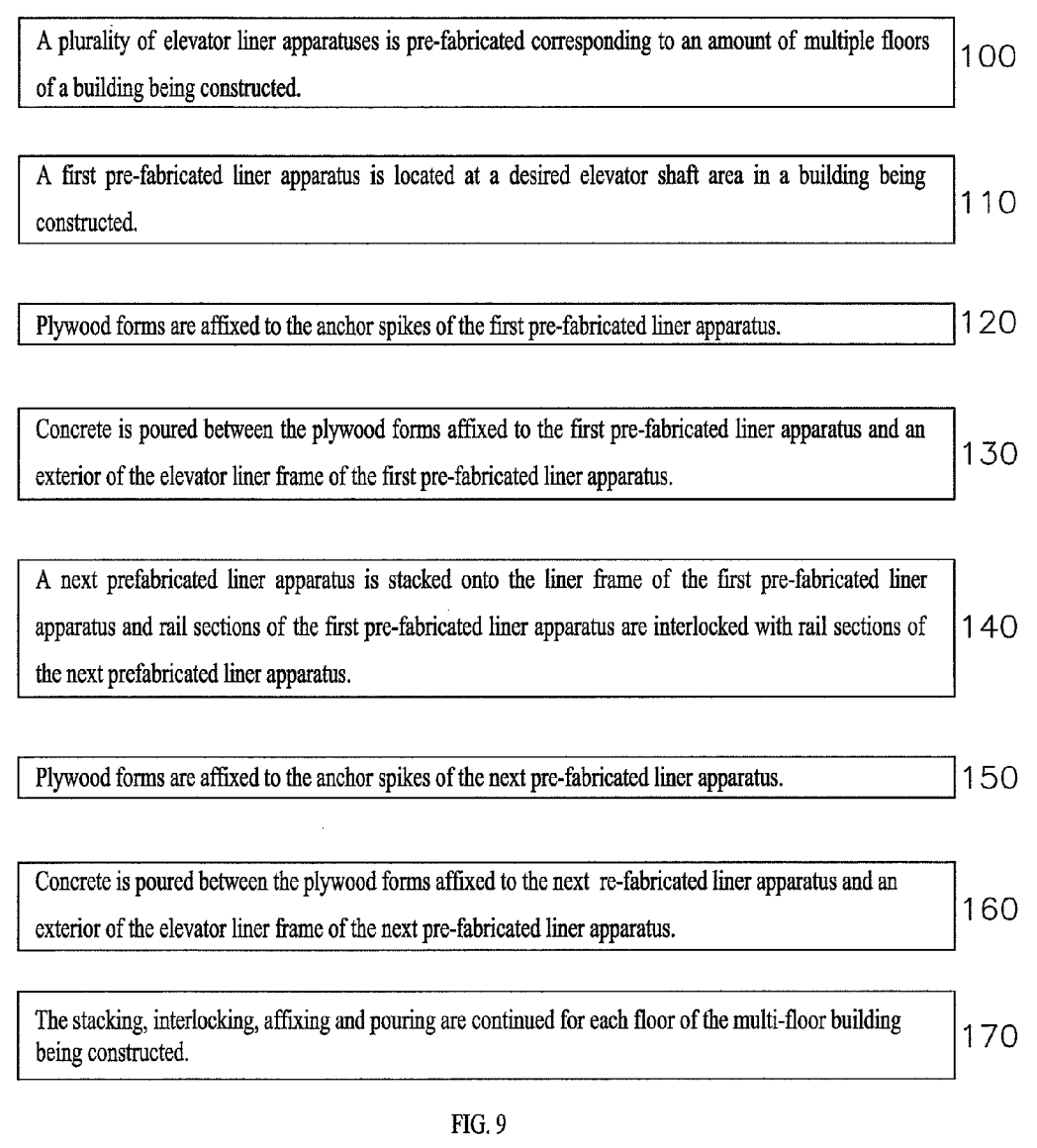

A plurality of elevator liner apparatuses is pre-fabricated corresponding to an amount of multiple floors of a building being constructed. 100

A first pre-fabricated liner apparatus is located at a desired elevator shaft area in a building being constructed. 110

Plywood forms are affixed to the anchor spikes of the first pre-fabricated liner apparatus. 120

Concrete is poured between the plywood forms affixed to the first pre-fabricated liner apparatus and an exterior of the elevator liner frame of the first pre-fabricated liner apparatus. 130

A next prefabricated liner apparatus is stacked onto the liner frame of the first pre-fabricated liner apparatus and rail sections of the first pre-fabricated liner apparatus are interlocked with rail sections of the next prefabricated liner apparatus. 140

Plywood forms are affixed to the anchor spikes of the next pre-fabricated liner apparatus. 150

Concrete is poured between the plywood forms affixed to the next re-fabricated liner apparatus and an exterior of the elevator liner frame of the next pre-fabricated liner apparatus. 160

The stacking, interlocking, affixing and pouring are continued for each floor of the multi-floor building being constructed. 170

FIG. 9

ELEVATOR LINER APPARATUS AND UTILIZATION METHOD THEREOF

CROSS-REFERENCE TO RELATED APPLICATION

This application claims priority to and the benefit of U.S. Provisional Patent Application No. 61/430,051, filed on Jan. 5, 2011, the entire content of which is incorporated by reference herein.

BACKGROUND

1. Technical Field

The present disclosure relates to building construction, and, more particularly, to pre-assembled elevator shaft liners for installation while concrete floors are being poured during building construction.

2. Discussion of Related Art

Common building construction of re-enforced concrete high rise/low rise buildings typically includes construction of elevator shafts and associated elevator machine rooms.

When erecting a multi-floor building, concrete is typically poured floor by floor, including pouring concrete walls of an elevator shaft. The elevator shaft walls to be formed are typically framed floor by floor by pairs of plywood sheets and concrete is poured between the sheets to form the required elevator shaft wall thickness.

When the elevator shaft wall length is completed and a roof is formed, the elevator rail system which accommodates elevator cab rollers is then installed. A temporary platform is typically built at the bottom of the shaft. Temporary cables are strung from the bottom to the top of the building to allow workers to work on the platforms, starting from the bottom and working their way to the top, drilling out the concrete elevator shaft walls, mounting rail mounting brackets to the walls and then mounting the rails to the rail mounting brackets.

However, problems can arise with the plywood forms "blowing out", namely, if the plywood forms are not uniformly straight, the poured concrete when dried can bulge out, leaving non-straight elevator shaft walls. Such bulges need to be chopped away with jackhammers or the like to provide straight walls prior to rail installation.

The above-described conventional shaft formation and rail system installation typically takes months to complete. Therefore, a need exists for an elevator shaft and rail system construction approach that can save months of construction time and resulting costs associated with the construction of buildings having elevators.

SUMMARY

In accordance with exemplary embodiments of the present invention, an elevator liner apparatus and method of utilization are provided that enable elevator rail and electrical trough systems to be installed in re-enforced concrete high rise/low rise buildings as the building concrete floors are being poured.

According to an exemplary embodiment of the present invention, rails are pre-installed on liner frames which are deliverable to a building construction job site ready to be installed and bolted together.

According to an exemplary embodiment of the present invention, an elevator liner apparatus includes an elevator liner frame sized to accommodate an elevator cab and elevator rails within the elevator liner frame. Rail mounting brackets are mounted to interior walls of the elevator liner frame.

The rail mounting brackets have elevator rail sections affixed thereto and have mounting bracket studs mounting the rail mounting brackets to the elevator liner frame and extending beyond exterior walls of the elevator liner frame. Anchor spikes are mounted to the elevator liner frame and extend beyond the exterior of the elevator liner such that plywood forms configured to form concrete elevator shaft walls are coupleable to the anchor spikes. Concrete is pourable between the plywood forms and the exterior of elevator liner frame. The concrete when dried affixes the mounting bracket studs and the anchor spikes in the dried concrete.

The elevator liner frame may include an International Standards Organization (ISO) shipping container having a top and bottom removed and sized to form stackable elevator liner frames.

The elevator liner frame may be sized to accommodate a pair of adjacent elevator cabs.

The elevator liner apparatus may further include a pair of I-beams mounted on the elevator liner frame to divide the elevator liner frame into a pair of elevator shafts that accommodate a pair of adjacent elevator cabs.

The rail mounting brackets may be mounted on the I-beams.

The elevator liner frame may include a concrete pour stop located on an exterior wall of the elevator liner corresponding to an elevator cab door location.

The elevator liner frame may include an electrical wiring trough affixed to an interior wall of the elevator liner frame and a floor button concrete pour stop located on an exterior wall of the elevator liner corresponding to a floor button location.

The elevator liner frame may be configured to be stackable and the rail sections may be configured to be joinable to an adjacent rail section when the elevator liner frame is stacked onto another elevator liner frame.

The rail sections may be joined by a splice plate coupled to ends of joinable rail sections.

According to an exemplary embodiment of the present invention a method of fabricating an elevator shaft for a multi-floor building being constructed is provided.

A plurality of elevator liner apparatuses is pre-fabricated corresponding to an amount of multiple floors of a building being constructed. Each elevator liner apparatus includes an elevator liner frame sized to accommodate an elevator cab and elevator rails within the elevator liner frame, rail mounting brackets mounted to interior walls of the elevator liner frame, the rail mounting brackets having elevator rails sections affixed thereto and having mounting bracket studs mounting the rail mounting brackets to the elevator liner frame and extending beyond exterior walls of the elevator liner frame, and anchor spikes mounted to the elevator liner frame and extending beyond the exterior of the elevator liner such that plywood forms configured to form concrete elevator shaft walls are coupleable to the anchor spikes. Concrete is pourable between the plywood forms and the exterior of elevator liner frame. The concrete when dried affixes the mounting bracket studs and the anchor spikes in the dried concrete.

A first pre-fabricated liner apparatus is located at a desired elevator shaft area in a building being constructed.

Plywood forms are affixed to the anchor spikes of the first pre-fabricated liner apparatus.

Concrete is poured between the plywood forms affixed to the first pre-fabricated liner apparatus and an exterior of the elevator liner frame of the first pre-fabricated liner apparatus.

A next prefabricated liner apparatus is stacked onto the liner frame of the first pre-fabricated liner apparatus and rail sections of the first pre-fabricated liner apparatus are interlocked with rail sections of the next prefabricated liner apparatus.

Plywood forms are affixed to the anchor spikes of the next pre-fabricated liner apparatus.

Concrete is poured between the plywood forms affixed to the next pre-fabricated liner apparatus and an exterior of the elevator liner frame of the next pre-fabricated liner apparatus.

The stacking, interlocking, affixing and pouring is continued for each floor of the multi-floor building being constructed.

BRIEF DESCRIPTION OF THE DRAWINGS

FIG. 9 is a flow chart depicting a method of fabricating an elevator shaft for a multi-floor building being constructed.

DETAILED DESCRIPTION

Figure 1A:
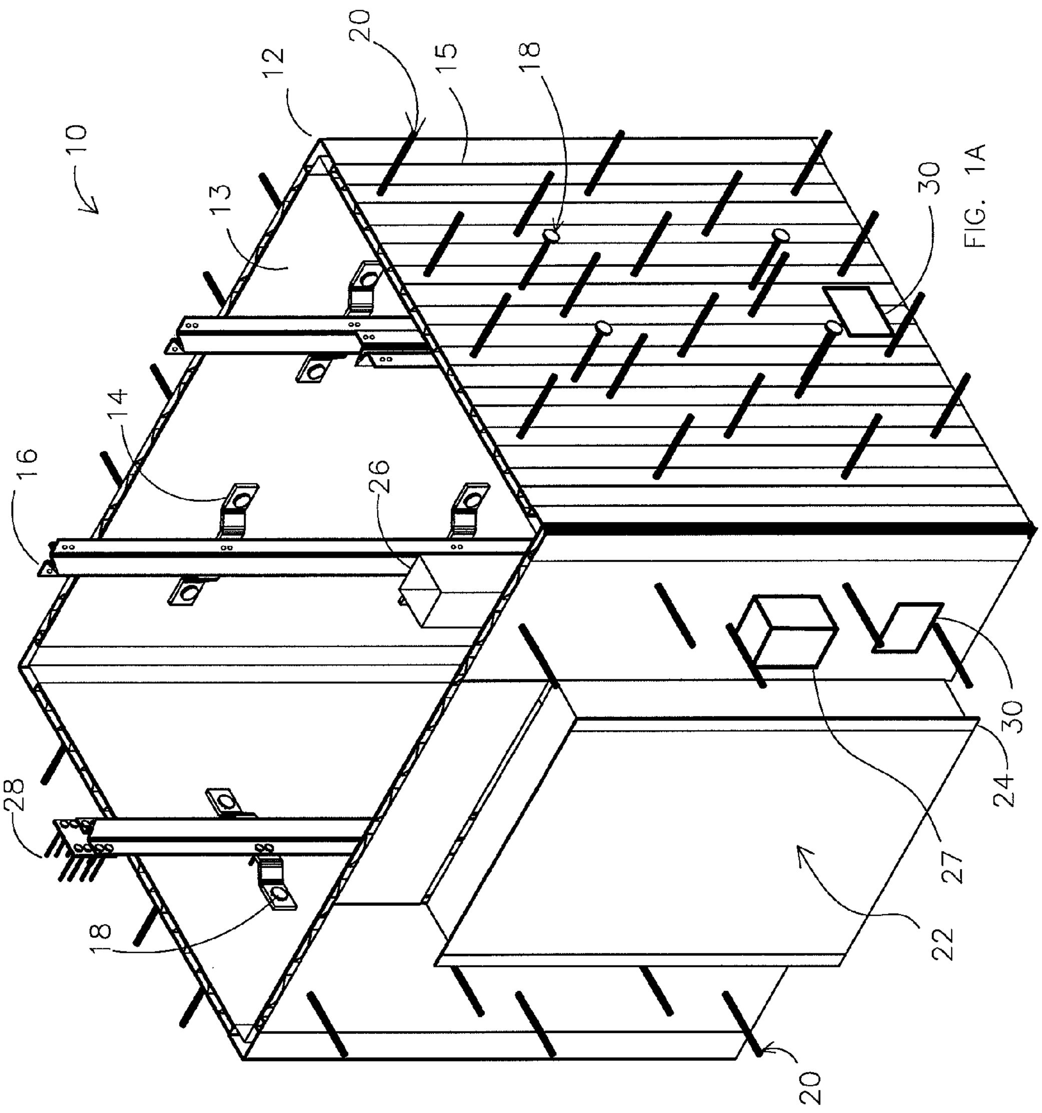
FIG. 1A is a perspective view of an elevator liner apparatus for a single elevator cab in accordance with an exemplary embodiment of the present invention.

Exemplary embodiments of the inventive concepts will now be described more fully with reference to the accompanying drawings wherein like reference numerals in the drawings denote like elements.

A typical elevator infrastructure includes a rail system affixed to walls of an elevator shaft and upon which an elevator cab is guided as it moves up and down the building. Typical elevator cabs have rollers mounted on sides of the elevator cab exterior which interface with rails that extend along an elevator shaft in the building. The rollers roll along the edges of corresponding rails that extend along the walls of the entire elevator shaft.

Figure 1B:
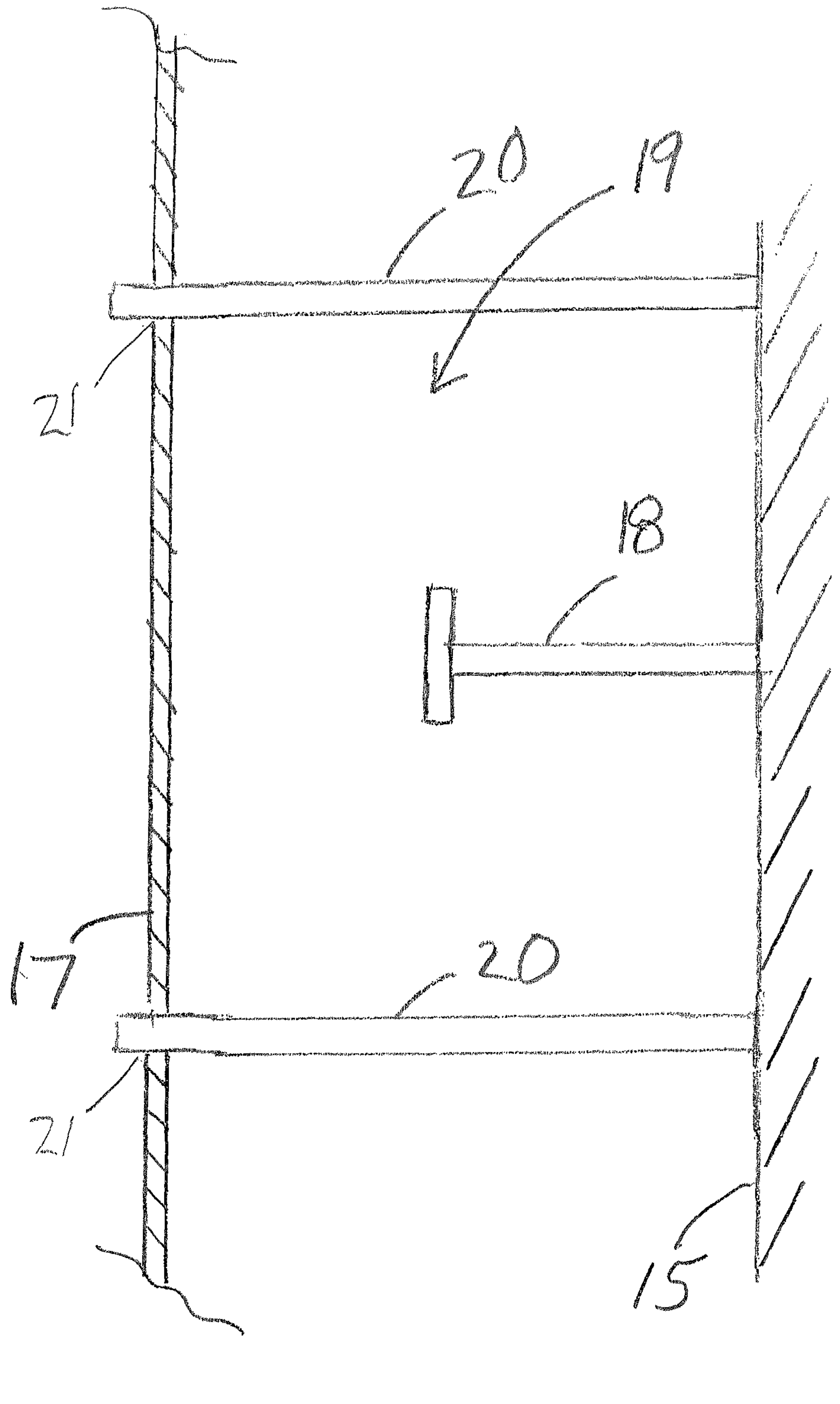
FIG. 1B is a schematic side view depicting a plywood form affixed to anchor spikes in accordance with an exemplary embodiment of the present invention.

Referring to FIGS. 1A and 1B, there is shown elevator liner apparatus 10 in accordance with an exemplary embodiment of the present invention. Elevator liner apparatus 10 includes liner frame 12. Liner frame 12 can be built from various materials that can support concrete being poured, for example, steel plates, steel channels, corrugated steel, and the like. Liner frame 12 may treated with a non-corrosive coating to prevent rusting and corrosion. Liner frame 12 is sized to accommodate a single elevator cab and corresponding elevator rails within the elevator liner frame. Liner frame 12 in FIG. 1A is shown for simplicity with only one exterior side wall being corrugated. However, each of the interior and exterior walls of liner frame 12 may be corrugated. Rail mounting brackets 14 are mounted to the interior walls 13 of liner frame 12 and have elevator rail sections 16 affixed thereto. Mounting bracket studs 18 mount rail-mounting brackets 14 to liner frame 12 and extend beyond exterior walls 15 of liner frame 12. Anchor spikes 20 are mounted to liner frame 12 and similarly extend beyond the exterior walls 15 of liner frame 12 such that plywood forms 17 (not shown in FIG. 1A) configured to form concrete elevator shaft walls around liner frame 12 are coupleable to anchor spikes 20. Rail mounting brackets 14, mounting bracket studs 18 and anchor spikes 20 may be of various construction strength material, such as steel and the like.

Upon installation of elevator liner apparatus 10 at a desired location of an elevator shaft in a building being constructed, concrete is pourable in an area 19 between exterior walls 15 of liner frame 12 and plywood forms 17 located around the exterior of liner frame 12, such that the concrete when dried affixes mounting bracket studs 18 and anchor spikes 20 in the dried concrete.

Elevator liner apparatus 10 includes concrete pour stop 22 affixed to liner frame 12 at a wall location where an elevator door will be situated and provides concrete flow stoppage at the elevator door openings. Concrete pour stop 22 is formed of sheet metal which is sized for the door opening and extends from liner frame 12 by a concrete pour size of 12 inches (which is a typical required elevator wall thickness per standard building codes) and is welded to the liner frame. Flange 24, which may be removable, is situated at the end of concrete pour stop 22 to which a plywood forming sheet (not shown) is screwed. Concrete pour stop 22 allows for the concrete to be poured around liner frame 12, while maintaining an opening in the poured concrete wall to allow access to an elevator cab within the elevator shaft. Upon removing flange 24, an opening to the elevator shaft becomes available.

Elevator liner apparatus 10 may include in an exemplary embodiment electrical wiring trough 26 which is affixed to a wall of liner frame 12 to allow electrical wiring, such as those needed for floor by floor elevator floor button controls, to extend along the elevator shaft.

Elevator liner apparatus 10 may include in an exemplary embodiment floor button concrete pour stop 27 which is sized to correspond to the elevator floor button controls, which are typically located approximately 48 inches from where a cab floor would stop when moving from floor to floor, and is structured and operates similar to concrete pour stop 22.

Those skilled in the art will appreciate that concrete pour stops protruding from the wall of liner frame 12 would not be needed when elevator liner apparatus 10 is to be installed for floors at which the elevator cabs do not stop, since a door opening or elevator floor button controls opening in the poured concrete would not be needed. Accordingly, such wall of line frame 12 would merely have anchor spikes 20 protruding.

Elevator liner apparatus 10 is provided for each floor along which an elevator cab will pass in the elevator shaft. As such, a plurality of elevator liner apparatuses 10 are vertically stackable, as will be discussed in more detail below. In view of such stackability, elevator rail sections 16 are joinable utilizing splice plates 28. Splice plate access hatches 30 may be provided on walls of liner frame 12 and situated to allow access to splice plates 28, for welding or bolting in place vertically adjoining rail sections 16. The use of splice plates 28 will be described in more detail below.

Figure 2:
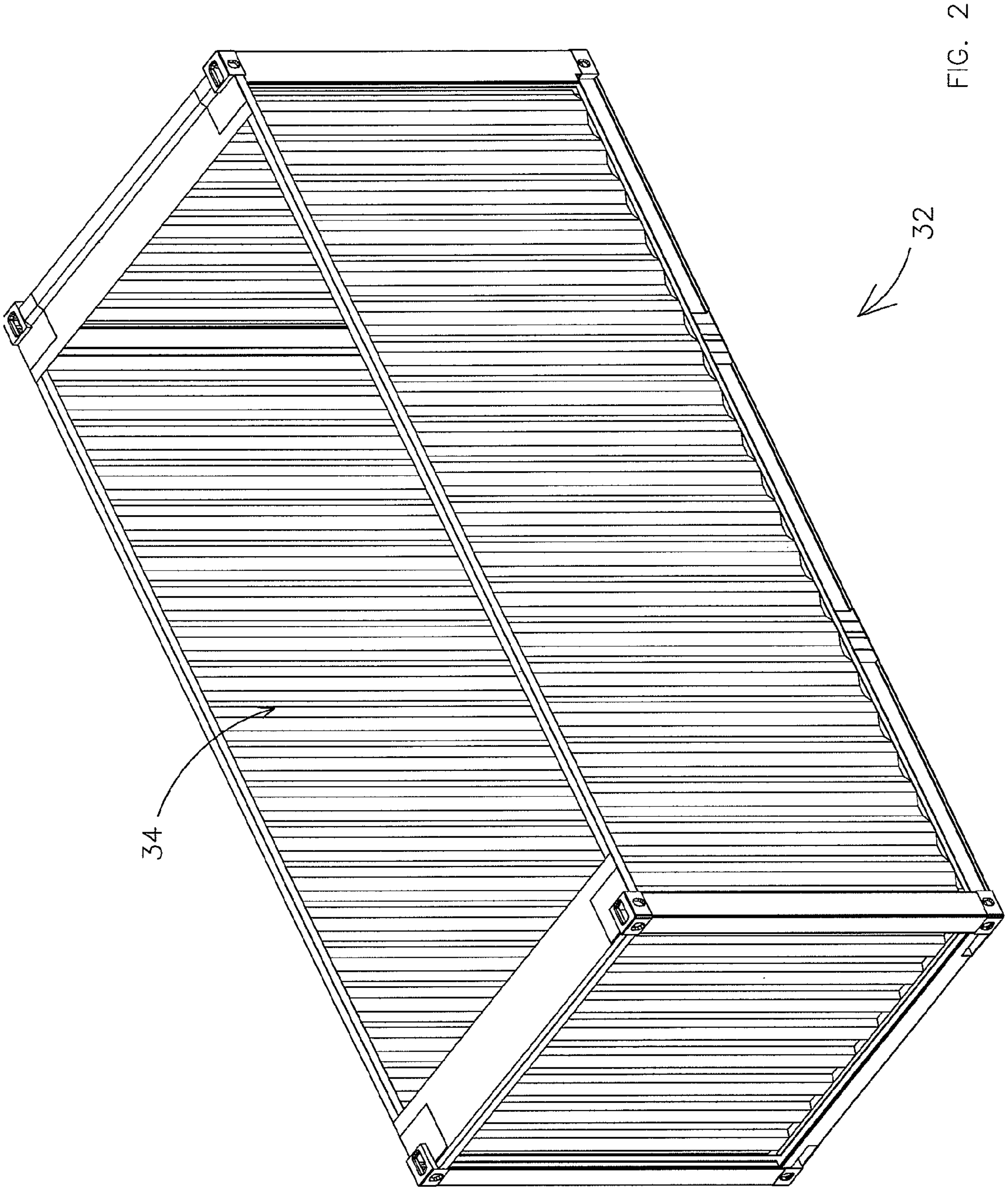
FIG. 2 is perspective view of a liner frame fabricated from a recycled shipping container in accordance with an exemplary embodiment of the present invention.

Referring now to FIG. 2, according to an exemplary embodiment, an International Standards Organization (ISO) specification standard pre-fabricated corrugated shipping container 32 may be recycled and modified to provide liner frame 12. Top wall 34 and its corresponding bottom wall (not shown) are removed to provide a frame for a single floor elevator shaft passageway. The length of the shipping container can be shortened by cutting through the walls and welding a side wall to accommodate a single cab elevator shaft size. Shipping containers can also be used vertically as well for a single cab application which serves multiple floors.

Figure 3:
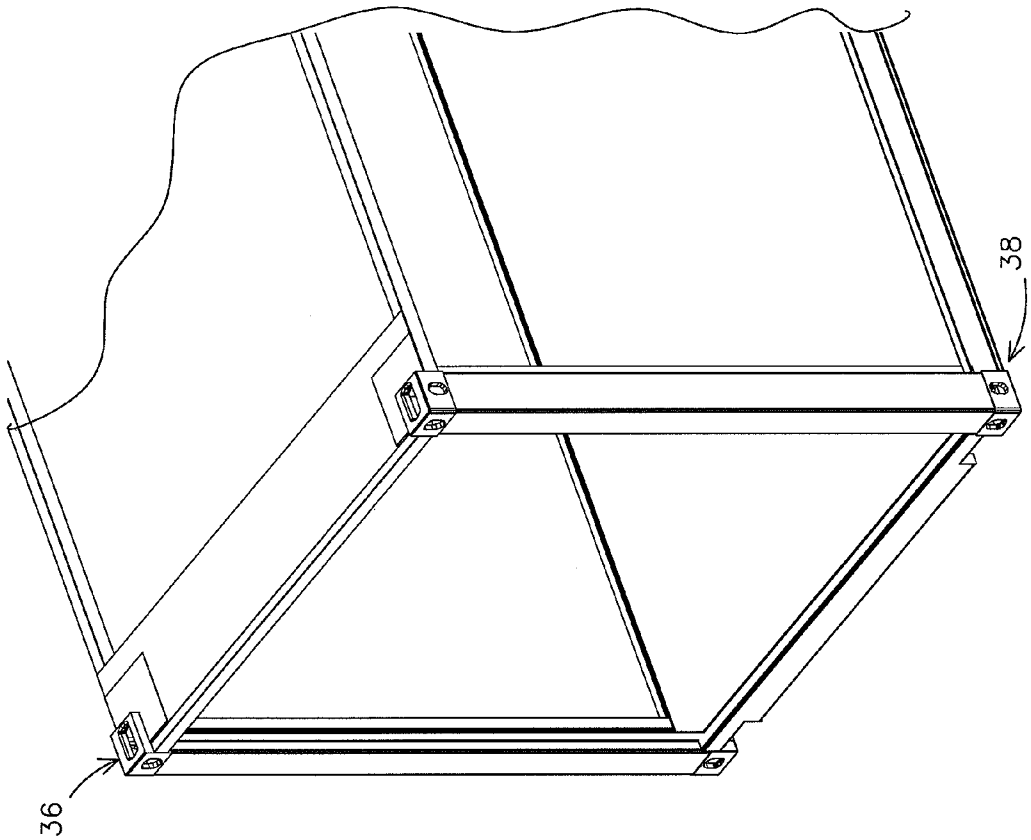
FIG. 3 is a perspective view of a portion of the shipping container depicted in FIG. 2.

Shipping containers 32 are designed to be stackable. Referring to FIG. 3, a portion of the frame of shipping container 32 of FIG. 2 is shown (without the corrugated walls depicted). Upper corners include sockets 36 for receiving protruding plugs 38 when shipping containers 32 are stacked. Such shipping container stackability allows for the stacking of elevator liner apparatuses 10 using the plug 38/socket 36 junctions to secure in place adjacent stacked liner frames, much like shipping containers are stacked on trucks, ships, and the like, for transporting and/or storing freight. Plug 38/socket 36 junctions may be modified to allow for minimal movement of stacked apparatuses, such as by inserting shims or otherwise securing the junction.

Figure 4:
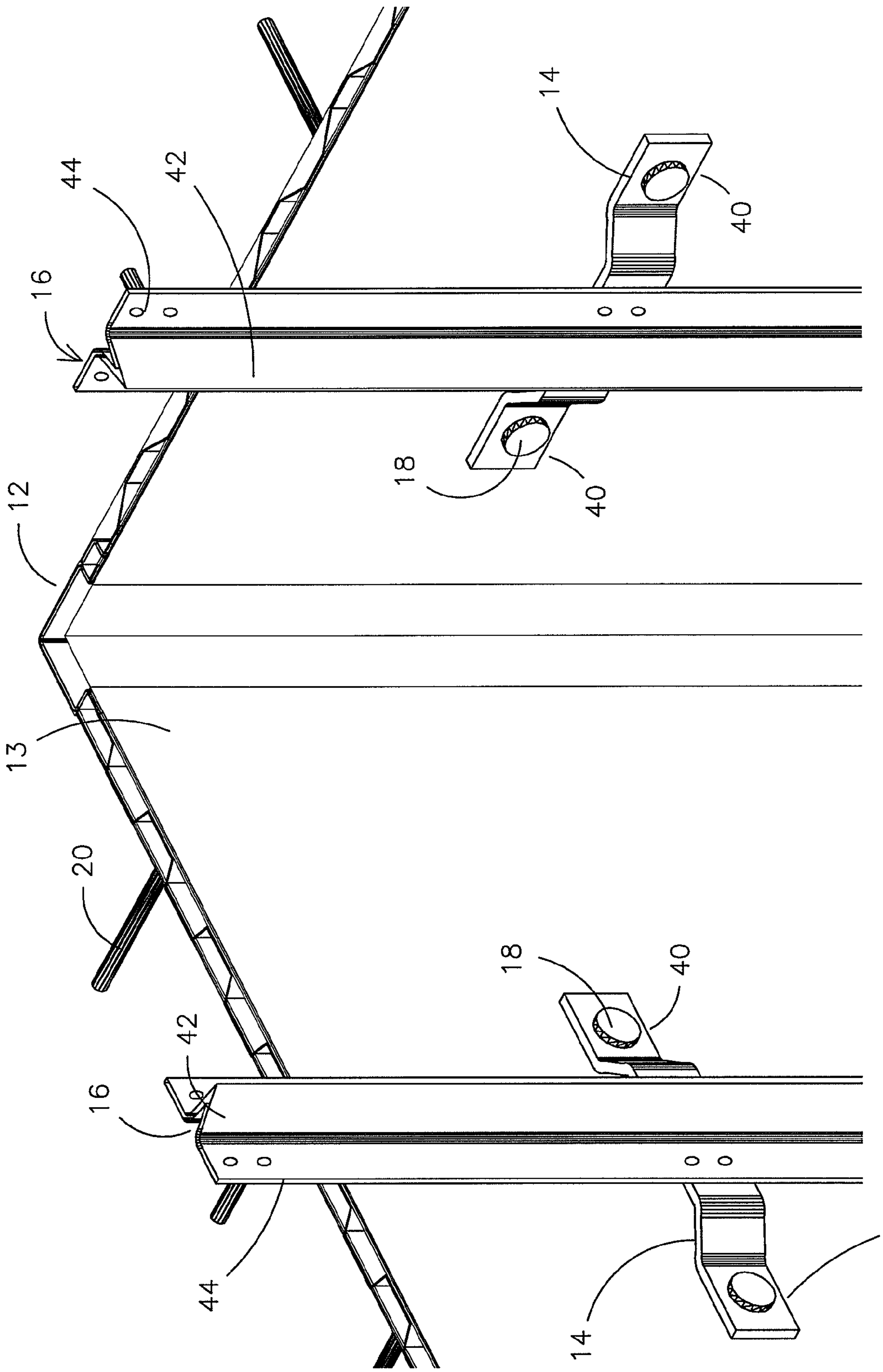
FIG. 4 is a perspective view depicting rail and rail mounting blocks mounted in a liner frame in accordance with an exemplary embodiment of the present invention.

Referring now to FIGS. 1A and 4, rail mounting brackets 14 are affixed to interior walls 13 of liner frame 12 such that a rail section 16 can extend through the top and bottom openings of liner frame 12. Each mounting bracket 14 has a pair of pads 40 at each end to affix each pad 40 to a respective interior wall 13 of liner frame 12. Mounting brackets 14 are located on interior walls 13 of liner frame 12 such that when respective rail sections 16 are affixed to mounting brackets 14, rollers of an elevator cabs (not shown) can interface with roller walls 42 of rail sections 16. In an exemplary embodiment rail sections 16 have triangular roller walls 42 and mounting flanges 44. Mounting flanges 44 may be affixed to mounting brackets 14 by bolting, welding, or the like. Mounting bracket studs 18, in an exemplary embodiment may be ⅝ inch to 1 inch steel rods, may have a flange 52 (shown in FIG. 5) at their extremities, are aligned with and welded to pads 40 such that mounting bracket studs 18 pass through and extend beyond exterior walls 15 of liner frame 12 by approximately 6 inches.

Figure 5:
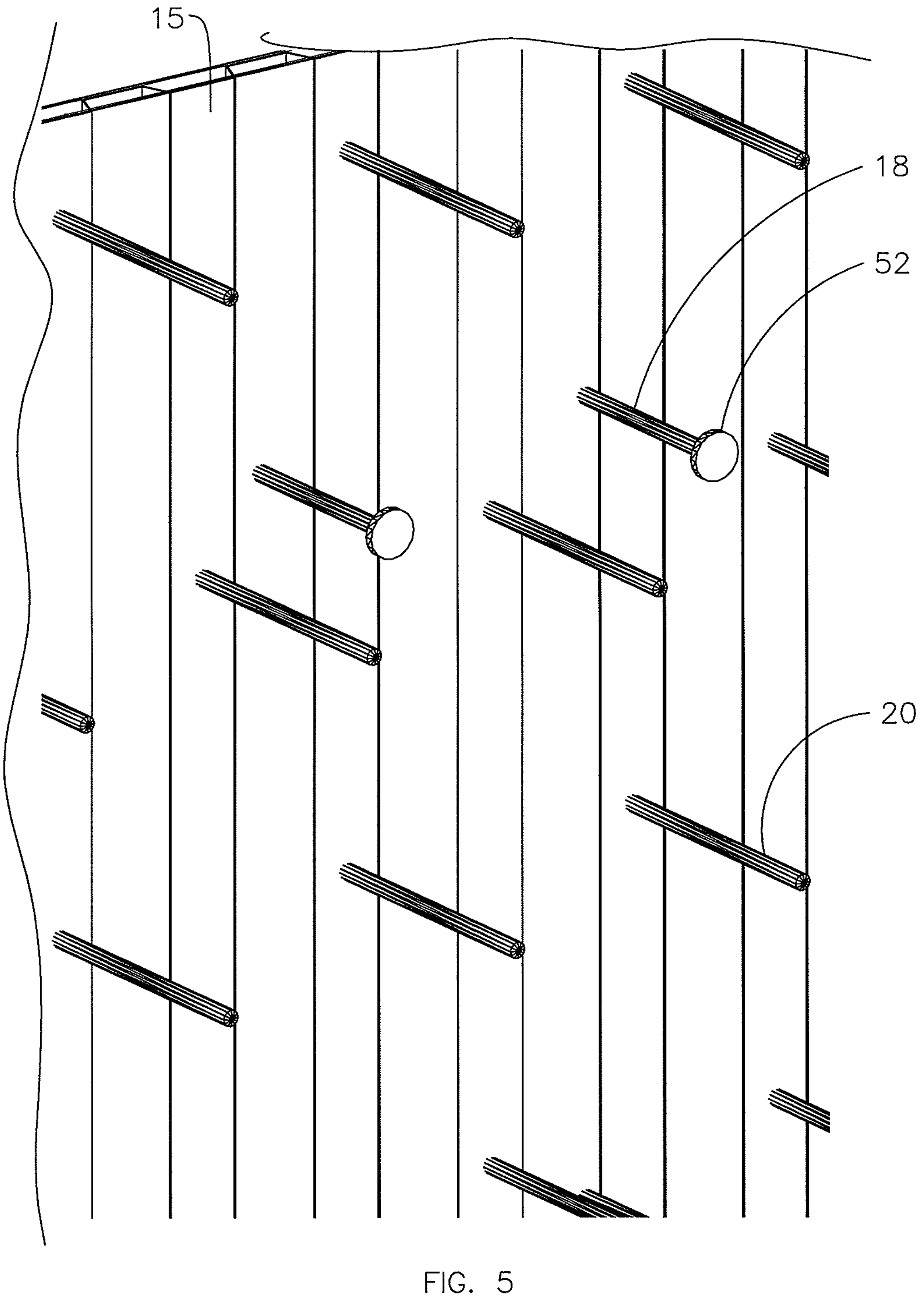
FIG. 5 is a perspective view of mounting bracket studs and anchor spikes protruding from an exterior wall of a liner frame in accordance with the present invention.

Referring now to FIGS. 1A, 1B and 5, anchor spikes 20, which may be steel rods approximately 1 foot-3 inches in length are welded apart to liner frame 12 in periodic rows sufficient to secure plywood sheet 17 having corresponding holes 21 that allow plywood sheet 17 to pass over anchor spikes 20 and be spaced apart from exterior wall 15 of line frame 12. Plywood sheet 17 would be affixed to an end of anchor spike 20 to provide an exterior boundary for elevator shaft wall concrete pouring between exterior wall 15 of liner frame 12 and plywood sheet 17. In an exemplary embodiment mounting bracket studs 18 may include a 1 inch flange 52 to help secure mounting bracket studs 18 in place when poured concrete is dried.

Figure 6:
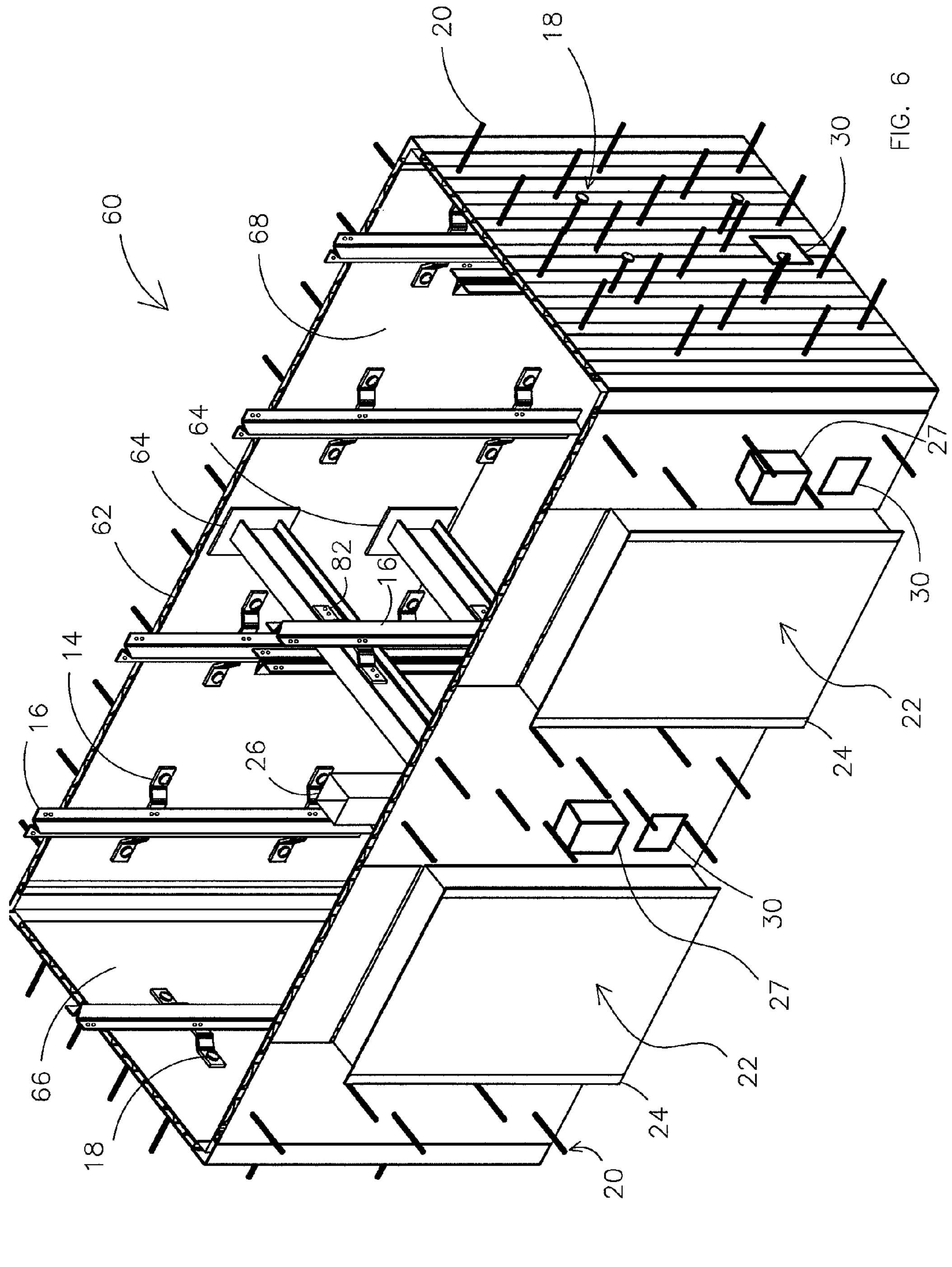
FIG. 6 is a perspective view of a dual elevator cab elevator liner apparatus in accordance with an exemplary embodiment of the present invention.

Referring now to FIG. 6, according to an exemplary embodiment dual-cab elevator liner apparatus 60 is depicted. Liner frame 62 is sized to accommodate a pair of side by side elevator cabs (not shown) that traverse adjacent multi-floor elevator shafts. Concrete pour stops, mounting brackets, rails and anchor spikes are provided much like the embodiment of FIG. 1A, with the exception of a pair of I-beams 64 replacing one of the walls of single cab liner 12. Each I-beam 64 is common to first shaft area 66 and second shaft area 68 and has mounted on opposing sides of I-beam 64 mounting brackets 82 which accommodate rail sections 16.

Figure 7:
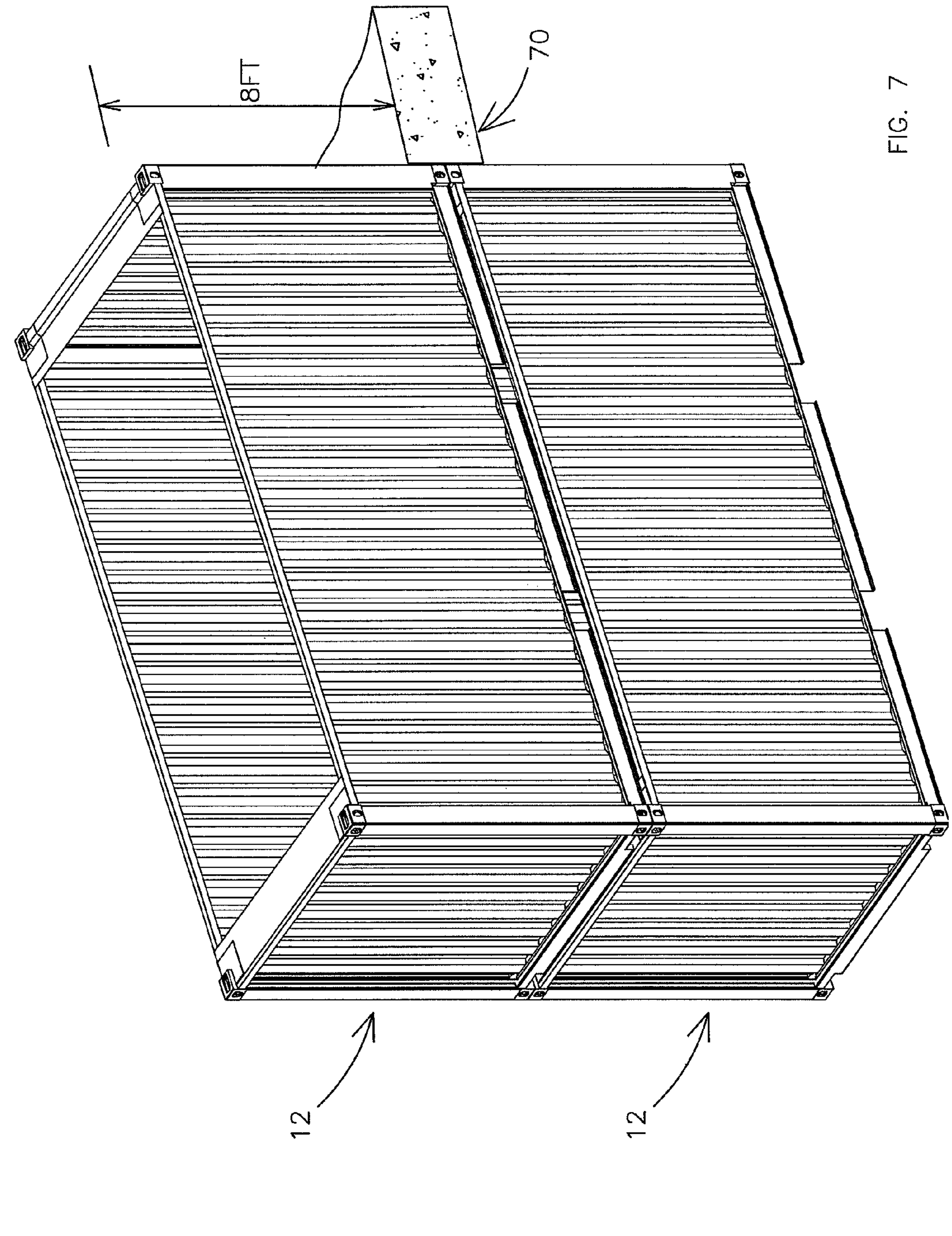
FIG. 7 depicts stacked liner frames formed of recycled shipping containers in accordance with an exemplary embodiment of the present invention.

Referring to FIG. 7, as mentioned above, liner frames 12 are stackable. For stacking, since typical building floors are spaced 8 feet apart and have 6" floor slabs 70, the typical height of each liner frame 12 is 8 feet, 6 inches high.

Figure 8A:
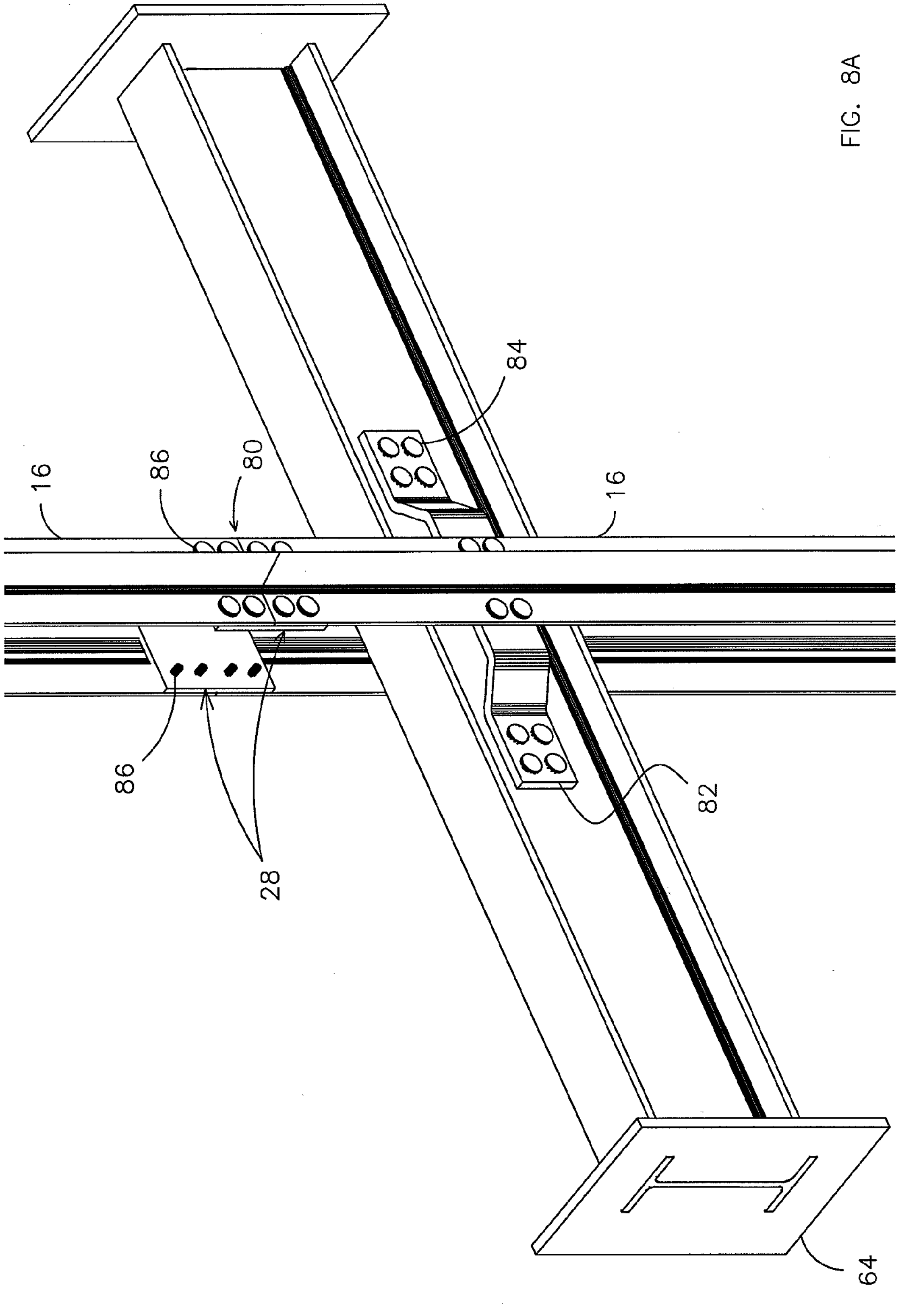
FIGS. 8A and 8B depict interlocking rail sections on an I-beam in accordance with an exemplary embodiment of the present invention.
Figure 8B:
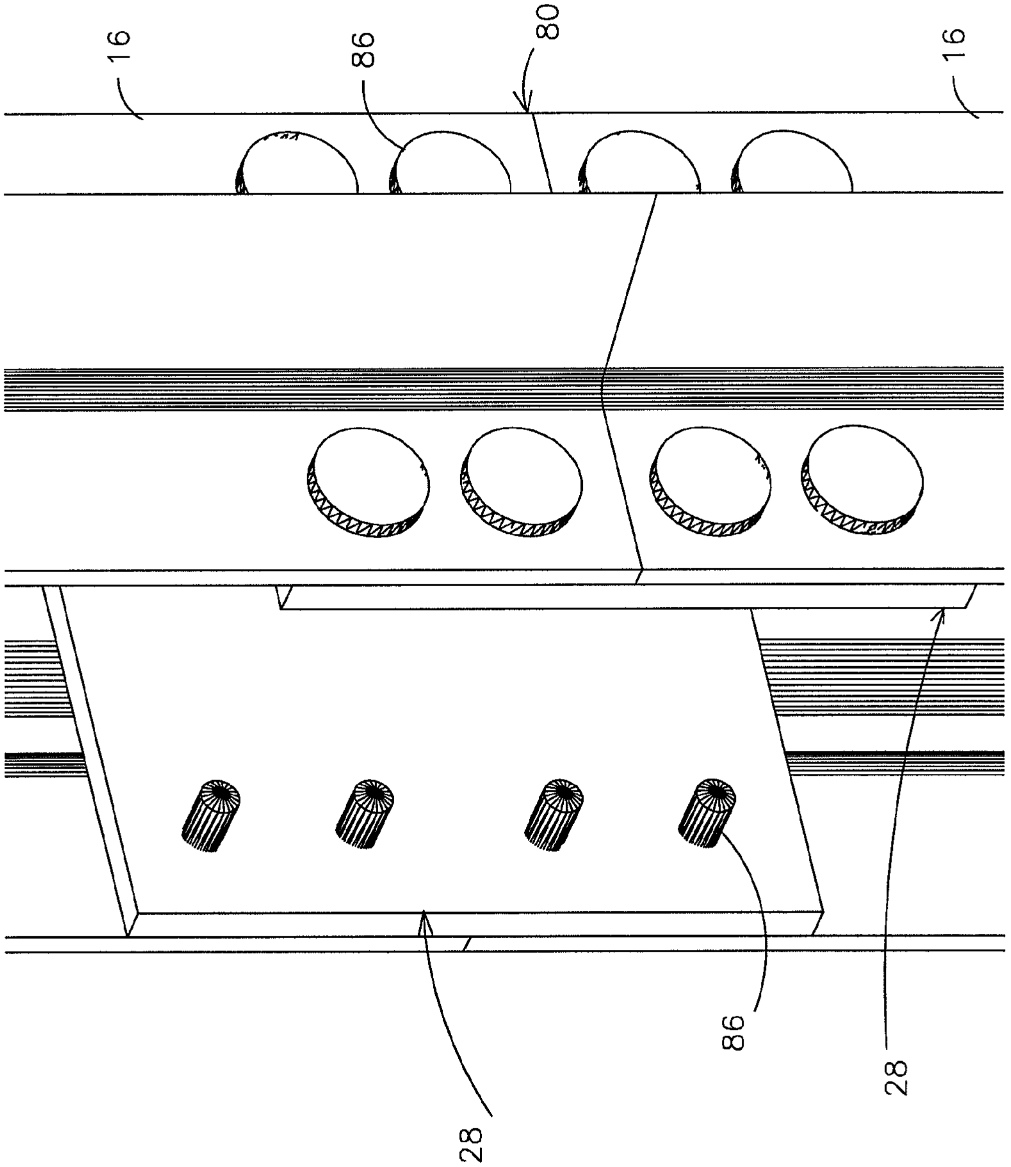

Referring to FIGS. 1A, 6, 8A and 8B, rail sections 16 have interlocking joints 80 such that rail sections 16 in vertically adjacent stacked liner frames 12 can interlock. FIGS. 8A and 8B show the interlocking joints 80 of the exemplary embodiment depicted in FIG. 6 wherein splice plates 28 affix together two adjoining rail sections 16 that vertically abut each other. Rail mounting bracket 82 is similar to rail mounting brackets 18 that mount to interior walls 13 of liner frame 12, with the exception that mounting studs 84 merely mount rail mounting bracket 82 to I-beam 64 and do not extend beyond a length needed to mount rail mounting bracket 82 to I-beam 64. As also seen in FIGS. 8A and 8B, mounting studs 86 have a length that can pass trough rail section 62 and engage splice plates 28 which may be bolted or welded in place.

Referring now to FIG. 9, a method of fabricating an elevator shaft for a multi-floor building being constructed is depicted.

In step 100 a plurality of elevator liner apparatuses is pre-fabricated corresponding to an amount of multiple floors of a building being constructed. Each elevator liner apparatus includes an elevator liner frame sized to accommodate an elevator cab and elevator rails within the elevator liner frame, rail mounting brackets mounted to the interior of elevator liner frame, the rail mounting brackets having the elevator rails affixed thereto and having mounting bracket studs mounting the rail mounting brackets to the elevator liner frame and extending beyond the exterior of the elevator liner frame, and anchor spikes mounted to the elevator liner frame and extending beyond the exterior of the elevator liner such that plywood forms configured to form concrete elevator shaft walls are coupleable to the anchor spikes. Concrete is pourable between the exterior of the elevator liner frame and plywood forms located around the exterior of elevator liner frame, the concrete when dried affixing the mounting bracket.

In step 110, a first pre-fabricated liner apparatus is located at a desired elevator shaft area in a building being constructed.

In step 120, plywood forms are affixed to the anchor spikes of the first pre-fabricated liner apparatus.

In step 130, concrete is poured between the plywood forms affixed to the first pre-fabricated liner apparatus and the exterior of the first pre-fabricated liner frame.

In step 140, a next prefabricated liner apparatus is stacked onto the liner frame of the first pre-fabricated liner apparatus and rail sections of the first pre-fabricated liner apparatus are interlocked with rail sections of the next prefabricated liner apparatus.

In step 150, plywood forms are affixed to the anchor spikes of the next pre-fabricated liner apparatus.

In step 160, concrete is poured between the plywood forms affixed to the next pre-fabricated liner apparatus and the exterior of the liner frame of the next pre-fabricated liner apparatus.

In step 170, the stacking, interlocking, affixing and pouring are continued for each floor of the multi-floor building being constructed.

According to exemplary embodiments of the present invention, rails are pre-installed in liner containers which are deliverable to a building construction job site ready to be installed and bolted together as the building concrete floors are being poured.

While exemplary embodiments have been particularly shown and described, it will be understood that various changes in form and details may be made therein without departing from the spirit and scope of the following claims.

For example, to accommodate various elevator cab manufacturer's rollers, the rails affixed to the mounting brackets rather than being V-shaped with the rollers interfacing with the exterior sides of the V sides, may be T-shaped with the rollers interfacing with the exterior sides of the T stem.

Rather than re-cycling shipping containers, steel boxes can be built by assembling and welding steel walls together having dimensions corresponding to re-cycled shipping containers, with or without walls being corrugated.

In addition to using the shipping containers to provide the liner frames for pouring elevator shaft walls, such shipping containers can be utilized to provide elevator machine rooms. An elevator machine room can be similarly pre-formed off-site, lifted up and placed upon the rail system. Elevator motors and elevator controllers would be pre-anchored onto interior walls of the machine room.

What is claimed is:

1. An elevator liner apparatus comprising:

an elevator liner frame sized to accommodate an elevator cab and elevator rails within the elevator liner frame;

rail mounting brackets mounted to interior side walls of the elevator liner frame, the rail mounting brackets having joinable elevator rail sections affixed thereto and having mounting bracket studs mounting the rail mounting brackets to the interior side walls of the elevator liner frame and extending beyond exterior side walls of the elevator liner frame; and anchor spikes mounted to the elevator liner frame and extending beyond the exterior side walls of the elevator liner frame such that plywood forms configured to form concrete elevator shaft side walls are coupleable to the anchor spikes, wherein the joinable elevator rail sections are aligned to interface with elevator cab rollers, and wherein concrete is pourable between the plywood forms and the exterior of elevator liner frame, the concrete when dried affixing both the mounting bracket studs and the anchor spikes in the dried concrete.

2. The elevator liner apparatus of claim 1, wherein the elevator liner frame is sized to accommodate a pair of adjacent elevator cabs.

3. The elevator liner apparatus of claim 2, further comprising a pair of I-beams mounted on the elevator liner frame to divide the elevator liner frame into a pair of elevator shafts that accommodate the pair of adjacent elevator cabs.

4. The elevator liner apparatus of claim 3, wherein the rail mounting brackets are mounted on the I-beams.

5. The elevator liner apparatus of claim 1, wherein the elevator liner frame is configured to be stackable and the joinable elevator rail sections are configured to be joinable to an adjacent joinable elevator rail section when the elevator liner frame is stacked onto another elevator liner frame.

6. The elevator liner apparatus of claim 5, wherein the joinable elevator rail sections are joined by a splice plate coupled to ends of the joinable elevator rail sections.

7. The elevator liner apparatus of claim 1, wherein the elevator liner frame comprises an International Standards Organization (ISO) freight container having a top and bottom removed and sized to form stackable elevator liner frames.

8. The elevator liner apparatus of claim 1, wherein the elevator liner frame comprises a concrete pour stop located on an exterior wall of the elevator liner corresponding to an elevator cab door location.

9. The elevator liner apparatus of claim 1, wherein the elevator liner frame comprises:

an electrical wiring trough affixed to an interior side wall of the elevator liner frame; and a floor button concrete pour stop located on an exterior side wall of the elevator liner frame corresponding to an elevator floor button location.

10. A method of fabricating an elevator shaft for a multi-floor building being constructed, the method comprising:

prefabricating an amount of elevator liner apparatuses corresponding to an amount of multiple floors of a multi-floor building being constructed, each elevator liner apparatus comprising:

an elevator liner frame sized to accommodate an elevator cab and elevator rails within the elevator liner frame;

rail mounting brackets mounted to interior side walls of the elevator liner frame, the rail mounting brackets having joinable elevator rail sections affixed thereto and having mounting bracket studs mounting the rail mounting brackets to the interior side walls of the elevator liner frame and extending beyond exterior side walls of the elevator liner frame; and anchor spikes mounted to the elevator liner frame and extending beyond the exterior side walls of the elevator liner frame such that plywood forms configured to form concrete elevator shaft walls are coupleable to the anchor spikes, wherein the joinable elevator rail sections are aligned to interface with elevator cab rollers, and wherein concrete is pourable between the plywood forms and the exterior of elevator liner frame, the concrete when dried affixing both the mounting bracket studs and the anchor spikes in the dried concrete, locating a first pre-fabricated liner apparatus at a desired elevator shaft area in a building being constructed;

affixing plywood forms to the anchor spikes of the first pre-fabricated liner apparatus;

pouring concrete between the plywood forms affixed to the first pre-fabricated liner apparatus and an exterior of the elevator liner frame of the first pre-fabricated apparatus;

stacking a next prefabricated liner apparatus onto the liner frame of the first pre-fabricated liner apparatus and interlocking joinable elevator rail sections of the first pre-fabricated liner apparatus with joinable rail sections of the next prefabricated liner apparatus;

affixing plywood forms to the anchor spikes of the next pre-fabricated liner apparatus;

pouring concrete between the plywood forms affixed to the next pre-fabricated liner apparatus and exterior side walls of the elevator liner frame of the next pre-fabricated liner apparatus; and continuing the stacking interlocking, affixing and pouring for each floor of the multi-floor building being constructed.

11. The method of fabricating an elevator shaft of claim 10, wherein the elevator liner frame is sized to accommodate a pair of adjacent elevator cabs.

12. The method of fabricating an elevator shaft of claim 11, further comprising a pair of I-beams mounted on the elevator liner frame to divide the elevator liner frame into a pair of elevator shafts that accommodate the pair of adjacent elevator cabs.

13. The method of fabricating an elevator shaft of claim 12, wherein the rail mounting brackets are mounted on the I-beams.

14. The method of fabricating an elevator shaft of claim 10, wherein the elevator liner frame comprises an International Standards Organization (ISO) freight container having a top and bottom removed and sized to form stackable elevator liner frames.

15. The method of fabricating an elevator shaft of claim 10, wherein the elevator liner frame comprises a concrete pour stop located on an exterior side wall of the elevator liner corresponding to an elevator cab door location.

16. The method of fabricating an elevator shaft of claim 10, wherein the elevator liner frame comprises:

an electrical wiring trough affixed to an interior side wall of the elevator liner frame; and a floor button concrete pour stop located on an exterior side wall of the elevator liner frame corresponding to an elevator floor button location.

17. The method of fabricating an elevator shaft of claim 10, wherein the elevator liner frame is configured to be stackable and the joinable elevator rail sections are configured to be joinable to an adjacent joinable elevator rail section when the elevator liner frame is stacked onto another elevator liner frame.

18. The method of fabricating an elevator shaft of claim 10, wherein the joinable elevator rail sections are joined by a splice plate coupled to ends of the joinable elevator rail sections.

* * * * *